United States Patent
Oh et al.

(10) Patent No.: US 11,079,400 B2
(45) Date of Patent: Aug. 3, 2021

(54) MONITORING A PRODUCT BUILD PROCESS VIA A SMART TRAY

(71) Applicant: HEWLETT PACKARD ENTERPRISE DEVELOPMENT LP, Houston, TX (US)

(72) Inventors: Sung Oh, Roseville, CA (US); Barry L. Goodwin, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 479 days.

(21) Appl. No.: 15/885,467

(22) Filed: Jan. 31, 2018

(65) Prior Publication Data
US 2019/0234972 A1 Aug. 1, 2019

(51) Int. Cl.
| | |
|---|---|
| G01N 35/00 | (2006.01) |
| H04L 29/08 | (2006.01) |
| H04W 4/80 | (2018.01) |
| H04W 4/70 | (2018.01) |
| H04L 29/06 | (2006.01) |
| H04L 12/26 | (2006.01) |
| G06Q 10/08 | (2012.01) |

(52) U.S. Cl.
CPC . *G01N 35/00623* (2013.01); *G01N 35/00871* (2013.01); *H04L 43/00* (2013.01); *H04L 63/00* (2013.01); *H04L 67/12* (2013.01); *H04L 67/34* (2013.01); *H04W 4/70* (2018.02); *H04W 4/80* (2018.02); *G06Q 10/087* (2013.01); *G06Q 10/0833* (2013.01)

(58) Field of Classification Search
CPC ...... G01N 35/00623; G01N 35/00871; H04W 4/70; H04W 4/80; H04L 63/00; H04L 67/12; H04L 67/34; G06Q 10/0833; G06Q 10/087; G01R 31/2894; G06F 2221/2113
See application file for complete search history.

(56) References Cited

U.S. PATENT DOCUMENTS

| | | | | |
|---|---|---|---|---|
| 8,606,536 | B2* | 12/2013 | Miguelanez | G01R 31/2894 702/118 |
| 10,543,988 | B2* | 1/2020 | Tsai | G01N 1/2214 |
| 2005/0171738 | A1 | 8/2005 | Kadaba | |
| 2014/0089243 | A1 | 3/2014 | Oppenheimer et al. | |
| 2017/0011572 | A1* | 1/2017 | Link, II | H04L 63/0853 |

FOREIGN PATENT DOCUMENTS

| | | |
|---|---|---|
| WO | WO-2016013925 A1 | 1/2016 |
| WO | WO-2016097822 A1 | 6/2016 |

OTHER PUBLICATIONS

Kubac, L., "Internet of Things and His Application in Logistic", (Research Paper), 2015, pp. 28-35. http://www.vslg.cz/wcd/docs/vslg/acta_logistika/5.-rocnik-2015/cislo-1-2015/4-kubac.pdf.

Macaulay, J. et al., "Internet of Things in Logistics", (Research Paper), 2015, 29 pages. http://www.dpdhl.com/content/dam/dpdhl/presse/pdf/2015/DHLTrendReport_Internet_of_things.pdf.

* cited by examiner

*Primary Examiner* — Elias Desta (74) *Attorney, Agent, or Firm* — Sheppard Mullin Richter & Hampton LLP (57) ABSTRACT

An apparatus receives environmental data indicative of environmental parameters in a vicinity of a smart tray bearing a product thereon. The apparatus receives from the smart tray, network data being transmitted to the product via a network port in the smart tray. At least one outlier in the environmental data or the network data is identified. An action to be executed at the smart tray is determined in response to identifying the outlier.

18 Claims, 7 Drawing Sheets

MONITORING A PRODUCT BUILD PROCESS VIA A SMART TRAY

BACKGROUND

The ubiquitous presence of data networks and the proliferation of computing devices including stationary or mobile devices has led to new technologies being developed every day. Internet of Things (IoT) is a technology which relates to a growing network of physical objects including sensors and related software and hardware so that the physical objects may exchange information with other physical objects or computing machines over a communication network such as the internet. IoT can connect a variety of devices ranging from cars, smartphones, wearable devices, machines on factory floors, oil drills etc. Accordingly, IoT implementations have expanded to applications in varied fields such as healthcare, transportation, communications, logistics etc.

BRIEF DESCRIPTION OF THE DRAWINGS

Features of the present disclosure are illustrated by way of example and not limited in the following figure(s), in which like numerals indicate like elements, in which.

DETAILED DESCRIPTION

Evolving technologies such as IoT are finding increasing applications in a variety of areas including supply chain systems. A supply chain involves a sequence of processes that relate to manufacturing and supply of various products. IoT technologies enable instantaneous data transfers thereby facilitating real-time monitoring of conditions of the products along the supply chain. Examples are disclosed herein for an IoT based observation and security system (IoT Boss) that monitors and secures a product build process including product testing in terms of quality and security. A smart tray may include a receptacle that can hold a product during the build process, and may include sensors to collect real-time environmental and/or network data associated with the product during the build process. The smart tray may include other components described herein and may be included in the IoT Boss. A remote analytics platform which receives the collected data from the smart tray and analyzes the collected data to determine the actions that may be required to correct or secure the product build process can also be included in the IoT Boss. The environmental data is collected in a passive mode in order to allow the production process to progress without interference from the monitoring procedures. However, the remote analytics platform enables the IoT Boss to halt the product build process when necessary in response to anomalies or outliers that may be detected.

The product build process, also referred to as the build process, is a manufacturing process for building a product or item. The product build process may include manufacturing, configuring and/or testing. The product being built or the unit under test (UUT) can include without limitation, a computing platform that includes both hardware and software. The collection of environmental data using the various sensors and analysis of the environmental data at the remote analytics platform enables detecting anomalies or outliers that may indicate that the product is not being manufactured under optimal conditions and hence the product quality may be compromised. Various elements of the environment in which the product build process occurs, such as, temperature, pressure, humidity, altitude may be monitored by the IoT Boss. The IoT Boss can also monitor security of the product build process such as the location at which the build process occurred as well as the personnel involved in the build process. For example, the IoT Boss can be configured to collect data from Global Positioning System (GPS) sensors and Radio-frequency identification (RFID) readers which enable sensing the location and the personnel data. The data from the various sensors can be transmitted to a remote analytics platform including a computing system which forms a part of the IoT Boss for determining an action, if any, is to be performed.

In addition to monitoring the assembly of the product hardware, the IoT Boss also enables monitoring and securing the software that is loaded into the product during the product build process. The product being assembled can be communicatively coupled to a factory automation infrastructure or a factory network for receiving network data, which may include software. For example, the network data including software may include firmware, updates, test scripts to be executed or other software that enable the product to perform its operations after the product build process is completed. The network data being transmitted to the product is also sent to the remote analytics platform for verification. Various verification mechanisms may be established to determine if the correct version of the software is being transmitted to the product via the network data and to ensure that the network data being transmitted to the product is not infected with malware or otherwise manipulated in ways that prevent the product from being utilized as intended. Different data authentication mechanisms such as but not limited to checksums, encryptions, compression formats and the like may be used to determine that the product is receiving the software.

The environmental data and the network data of the product is received at a remote analytics platform. The remote analytics platform may include an IoT hub which is configured to monitor numerous product build processes as described above. The IoT hub may be connected to billions of sensors at disparate locations in order to monitor and control the product build processes. The IoT hub may in turn provide the received environmental data and the network data to a data processor such as a big data server for further processing. The data processor can implement methodologies whereby the anomalies in the environmental data, the network data or combinations of the environmental data and the network data are detected. Based on the extent of deviation of the anomalies from predetermined thresholds configured within the data processor, various actions such as but not limited to, transmitting notifications to responsible personnel or even shutting down the product build process may be executed.

The collection and transmission of the environmental data and the network data to the remote analytics platform is enabled by a tray on which an assembled product is placed for testing, according to an example. After assembly, the product is transferred to the tray and all the data input and output goes through the interfaces of the tray. The tray can be configured as a 'smart tray' which, in addition to various interfaces, includes a Central Processing Unit (CPU), memory, storage, operating system (OS) and other off-the-shelf or proprietary software to execute functions described herein. An input/output (I/O) interface(s) may connect to various sensors such as but not limited to temperature, pressure, humidity, location attributes such as altitude and GPS coordinates and the like that provide the environmental data. As the sensors are affixed to the tray, the sensors are able to sense and provide the environmental parameters in the vicinity of the product. A number of such trays may be arranged one below another on a rack. A manufacturing establishment may have tens or hundreds of such racks enabling simultaneous testing of numerous products.

Most products that necessitate assembly of hardware and software may be assembled at contract manufacturing units which may or may not be controlled by an owner of the product. The various physical parts (e.g., hardware) to be placed into the product are delivered to the manufacturing units where the manufacturer assembles the physical parts to make up the products such as servers, network switches, data storage units and the like. Once assembled, the product is moved to a test stage where firmware or other software is downloaded and installed into the product. The product and its various components are then tested to ensure proper functioning. A producer or owner responsible for the product may provide a server or a datacenter component in the manufacturing units from where the firmware can be downloaded. The network ports of the product may be connected to the manufacturer's network and the firmware etc. may be downloaded over the factory network. The information communicated in this manner may be insecure, risking both theft of intellectual property (IP) and making the product vulnerable to attack. This is because the various systems of the product are not yet fully installed and thereby the product is unable to defend itself.

Furthermore while existing solutions that monitor factory environments have stationary sensors (temperature and other environmental data), they seldom correlate to an individual unit or product as it progresses through the factory. Indeed, the sensors may merely report the average factory temperature over an entire shop floor rather than the temperature at the precise location where the product is assembled or tested. Also, the various sensors may rarely report information to a common data collection device. Moreover, the stationary set of sensors do not have the ability to sense factors such as g-forces that affect a particular product or unit.

The IoT Boss as disclosed herein provides a total solution package including hardware, software and method for monitoring and securing the product as it is being manufactured. IoT Boss provides consistency of data collection regardless of the factory infrastructure. Identical products built in different factories around the world with differing infrastructures may yet have the same information collected and analyzed. The sensor data associated with each individual unit or product is pushed to a remote centralized data lake associated with a remote analytics platform for analysis in real-time to detect vulnerabilities in terms of quality or security. For example, alerts or immediate responses to be executed at the manufacturing location are enabled on the IoT Boss. Moreover, as the IoT hub receives such sensor data from many manufacturing units, the historical trends in the sensor data may be analyzed and solutions may be learned for improving the quality of security of the product build processes.

In addition to the sensor data, the IoT Boss also provides for a centralized storage to receive the network data that is uploaded to the product. Therefore, the remote analytics platform is provided with capabilities to identify synergistic trends in combinations of the sensor data and the network data. As the computer-based products (e.g., compute servers, storage arrays, network switches, routers etc.,) begin their production cycle as virgin units with no ability to detect or defend against malicious attacks, such products can be easily infected with malware. As the IoT Boss transparently monitors network traffic with functionality of an intrusion prevention system (IPS) built in, units or products are protected during the build or testing process until such a time as the product's systems become fully functional and the product is able to protect itself. It can be appreciated that while the disclosure refers to build and testing procedures in different instances, these terms are used synonymously throughout.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
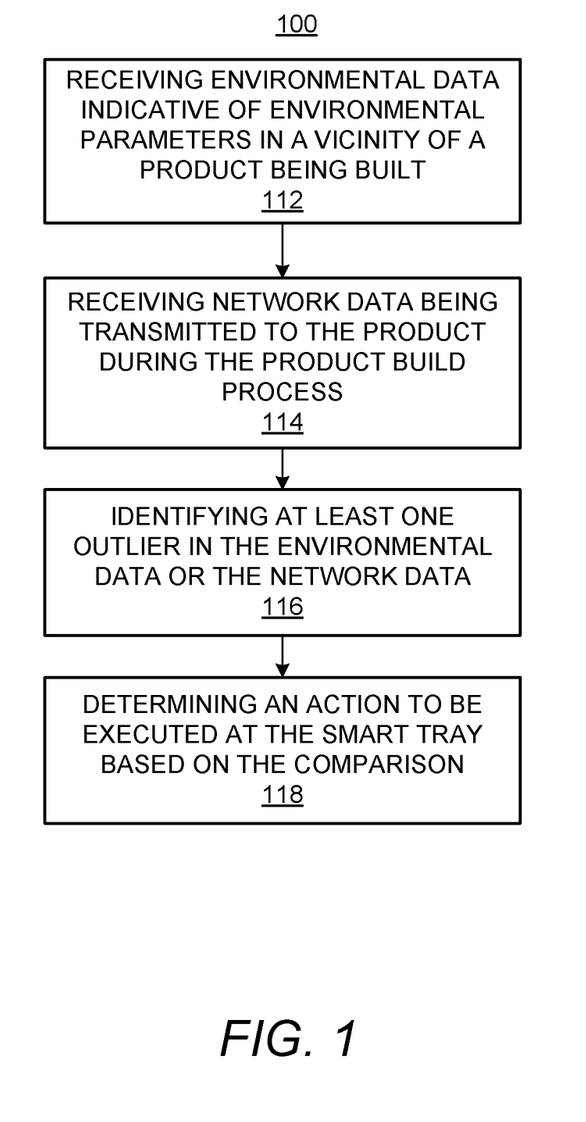
FIG. 1 shows a flow diagram of an example method for monitoring and securing a product build process.
Figure 2:
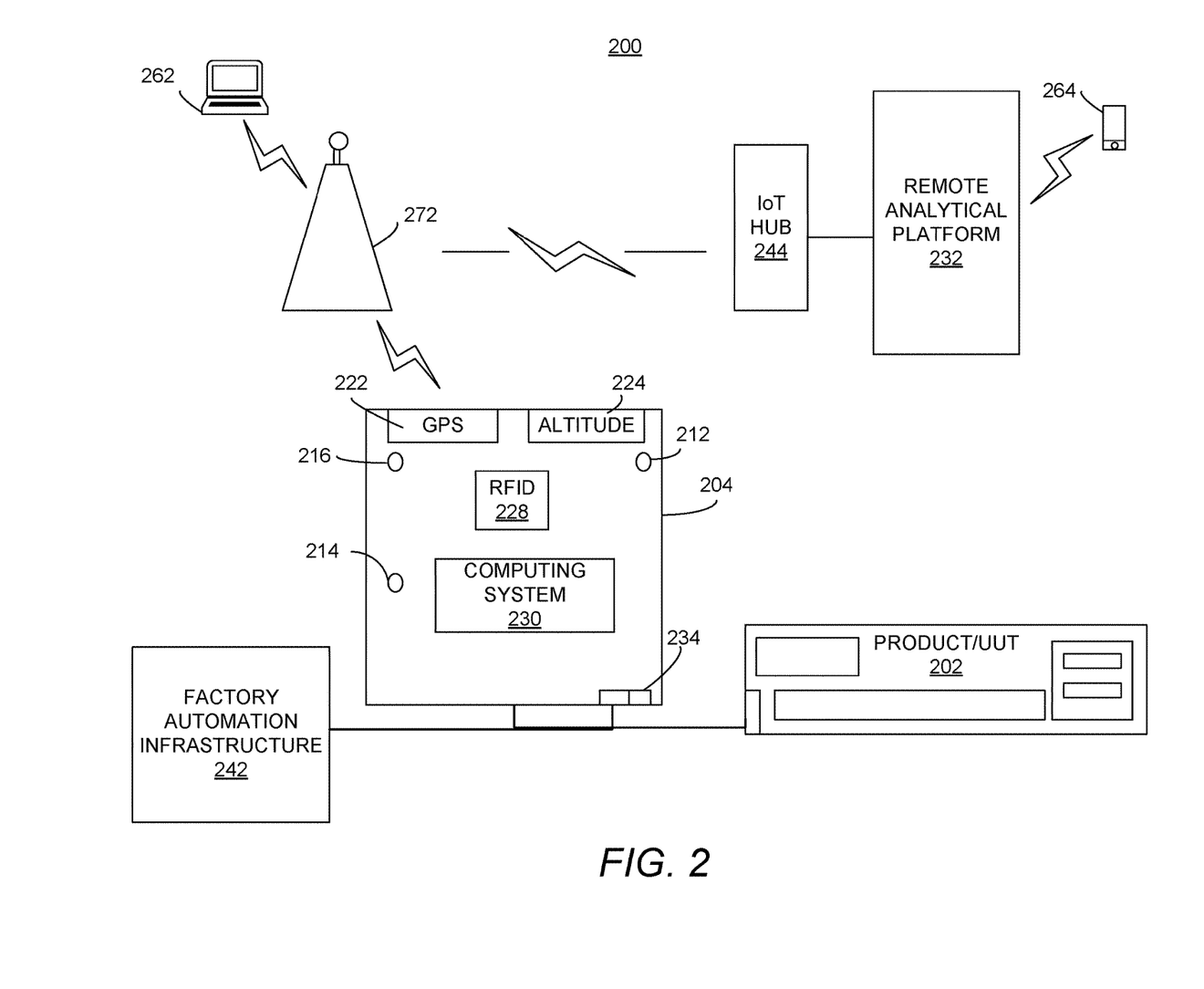
FIG. 2 depicts an example eco system where the method is employed in accordance with examples disclosed herein.

With reference first to FIG. 1, there is shown a flow diagram of an example method 100 for monitoring and securing a product build process. It should be understood that the method 100 depicted in FIG. 1 may include additional operations and that some of the operations described therein may be removed and/or modified without departing from the scopes of the method 100. The description of the method 100 is made with reference to the features depicted in FIG. 2 for purposes of illustration. FIG. 2 depicts an example eco system 200 where the method 100 is employed in accordance with examples disclosed herein.

Figure 5:
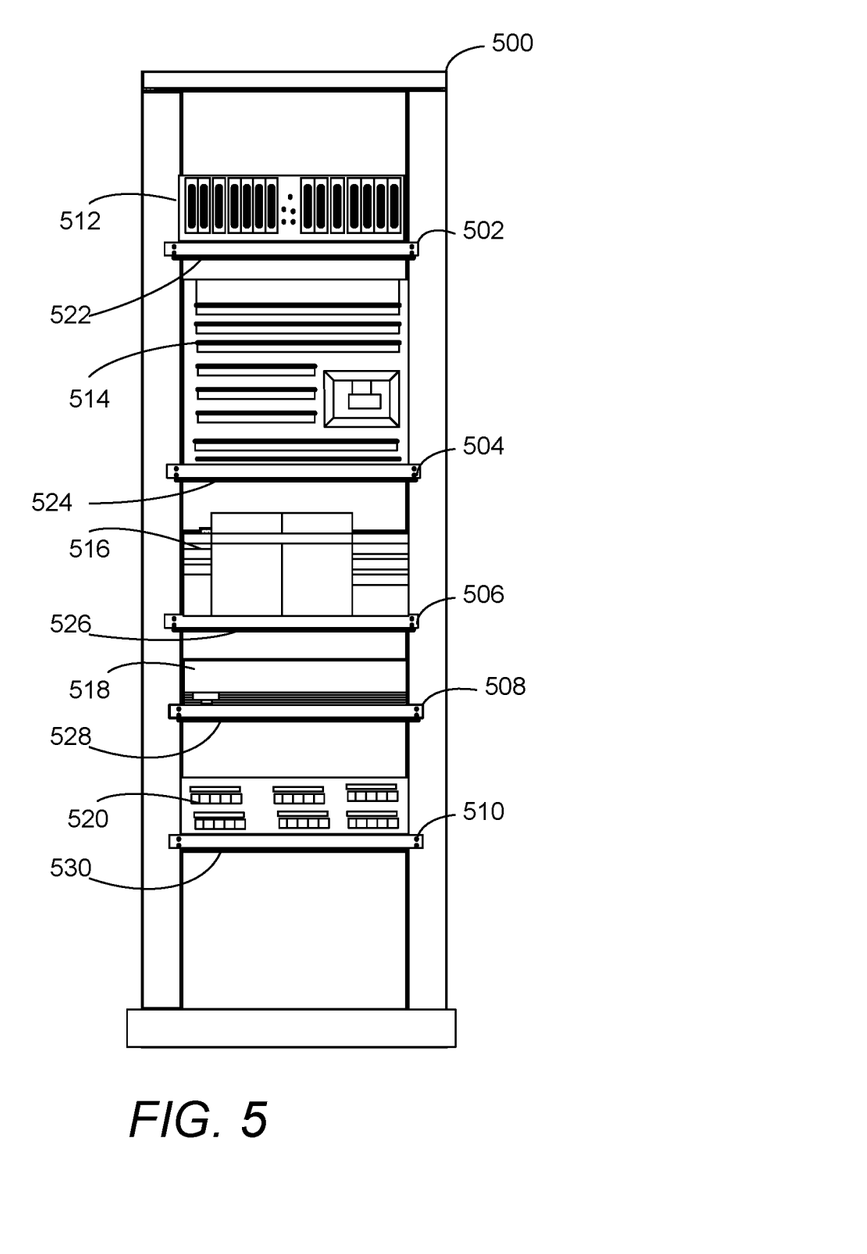
FIG. 5 illustrates a plurality of the trays arranged on a rack one below another in accordance with the disclosed examples.

The method 100 begins at block 112 wherein the environmental data indicative of environmental parameters in a vicinity of a product build process or the location where a product is being built or a unit is being tested is received. Referring to FIG. 2, a product or unit 202 such as a compute server, a router, a disk drive, etc., including hardware and software, is being built or under test prior to being shipped out to customers. The build or testing systems include a tray 204 shaped and sized to receive the product 202 thereon during the testing procedure. Once the hardware of the product 202 is assembled or while the product is being manufactured, the product 202 is placed on the tray 204. Examples of the product on the tray are shown in FIG. 5. The tray 204 is configured as a 'smart tray' which may include sensors 212, 214, 216, an RFID reader 228 for reading RFID tags in the vicinity of the product 202 being built, a computing system 230 and a wireless transceiver. The sensors 212, 214, 216 and RFID reader 228 may be detachable or permanently affixed to the tray 204. Environmental data indicative of environmental parameters such as but not limited to temperature, pressure, humidity and the like can be collected by the sensors 212, 214 and 216 which may include thermometers, hygrometers and the like. The tray 204 can also include sensors such as a GPS sensor 222 and altitude sensor 224 for obtaining attributes of the location where the product 202 is tested on the tray 204. As the sensors are attached to the tray, the sensor data or the environmental data reflects the immediate environment of the product 202 rather than the factory as a whole. For example, a temperature sensor on the tray 204 can detect if the product 202 overheats due to a broken fan.

The environmental data including the location attributes from the various sensors is received at a remote analytics platform 232 as described at block 112 of FIG. 1. The computing system 230 included in the tray 204 enables the collection and transmission of the environmental data to the remote analytics platform 232. The various sensors 212, 214, 216, 222 and 224 therefore enable the remote analytics platform 232 to receive the environmental parameters in the immediate vicinity of the product being built. Hence, the remote analytics platform 232 is able to monitor the environment of the individual product as opposed to average environmental data that is generally collected by factory monitoring systems.

In addition to monitoring the physical surroundings of the product, the remote analytics platform 232 also receives network data being transmitted to the product during the product build process as shown at block 114 of FIG. 1. As the finished version of the product 202 includes both hardware and software, the product 202 is connected to the factory automation infrastructure 242 via a network port 234 which may include a first network port and a second network port on the tray 204 after the requisite hardware is assembled. The factory automation infrastructure 242 provides access to the power and data resources to the equipment within the manufacture unit where the product 202 is being built. The network data that is transmitted to the product 202 via the power port or network port 234 can include the necessary software needed for the product to function as intended in product specifications. Based on the exact nature of the product 202, one or more of operating systems, application software, firmware, device drivers or other software updates and the like may be included in the network data uploaded to the product 202. The product 202 at this stage is vulnerable to malware or other malicious code via the factory automation infrastructure 242. In case the factory automation infrastructure 242 gets infected, it can affect the quality of the product 202. Hence, the network data transmitted to the product 202 is also passed to the remote analytics platform 232 for examination along with the environmental data collected by the various sensors. In an example, if the factory automation infrastructure 242 is associated with a contract manufacturer, the remote analytics platform 232 may be associated with a client of the contract manufacturer so that the client can receive the performance statistics of the contract manufacturer in real-time. Also, according to an example, the smart tray may include a wireless network interface. The environmental data and the network data may be passed through the wireless network interface of the tray to a wireless access point in the factory. It is typically easy to install an access point and wireless network in a contract manufacturer's factory, but difficult to install physical cabling. Accordingly, the environmental data and the network data from the tray 204 may be received at the remote analytics platform 232 via a network transceiver 272 to an IoT hub 244 that is configured to exchange communications with numerous IoT devices.

The environmental data and the network data thus received is processed at the remote analytics platform 232 for identifying outliers or anomalies within the received data. In an example, the remote analytics platform 232 may be a big data server processing data from billions of IoT devices scattered across diverse geographical locations. Big Data generally refers to technologies that enable creation, storage, retrieval and analysis of data that is too diverse, fast-changing and massive for conventional database systems. Statistical methods may be implemented by the remote analytics platform 232 to identify trends from the massive datasets. For example, levels of environmental parameters such as, temperature, pressure or humidity at a given location of a product build process may be monitored and compared with the average levels so that anomalies or outliers such as upward or downward spikes in the environmental parameters are identified. An outlier or an anomaly can be a piece of data or an observation that deviates by a predetermined amount from a given norm or the average of the data set. Numerical outliers, such as those that may occur in the environmental data, for example, "lie outside" the normal distribution curve. Various mathematical methods can be employed to detect outliers in numerical environmental parameters. For outliers in the network data, an unexpected result such as a failure of authentication of the software to be loaded into the product 202 can be considered an outlier. In the network data, outliers or anomalies detected may include without limitation, a count of the number times a product was infected at that particular manufacturing location and/or during the particular instances/occurrences of environmental parameters and/or RFID data values. Moreover, as the environmental parameter data is received along with the network data and other information such as the location attributes, correlations between these diverse data sets may be identified. For example, repeated occurrences of glitches in the network data of products built or tested at a certain location and detection of certain RFID data indicative of a particular part in the product 202 or RFID data indicative of the presence of a worker in the vicinity of the product 202 may be identified via correlations between the various data sets received by the remote analytics platform 232. As the exception values in the environmental data, the network data or correlations thereof occur rarely, they can be termed as anomalies or outliers.

In response to the outliers thus identified at block 116, the actions to be executed to mitigate the damage to the product 202 arising due to the non-optimal production environment are enabled. Based on the type of outlier or the type of data in which the outlier occurs, the actions may be determined at 118. If the outliers are in the environmental data, such outliers are generally numerical values pertaining to the sensor readings. The environmental data outliers, which may be identified according to a distribution curve or other known mathematical process, may be compared to a predetermined. The extent of deviation of the outlier from an average or the threshold can be indicative of the severity of the environmental conditions at the product build location. The remote analytics platform 232 may set or maintain specific ranges for each of the environmental parameters measured by the various sensors 212, 214, 216 etc. on the tray 204. The remote analytics platform 232 determines if the data values received from the sensors 212, 214, 216 etc. are within the set ranges. Similarly, the correlations between particular elements of the sensor data and the network data may also be flagged based on the number times the correlation has been recorded or the severity of the environmental parameter involved in the correlation. Action may involve transmitting alerts or notifications or performing other actions in response to determining the environmental data includes values or correlations outside thresholds.

When the outlier is in the network data, the remote analytics platform 232 may determine, at block 118 of FIG. 1, an action to be executed at the tray 204 in order to mitigate the consequences arising from the outlier that adversely impact the quality of the product 202 or the security of the product build process. For example, the outlier in the network data may involve an authentication failure wherein a comparison of a value such as the checksum at the tray 204 differs from a checksum at the remote analytic platform 232. For example, the network data may include software or data sent in a file to the product 202. A checksum of the file may be calculated and compared to a checksum of the file that is received from a trusted source to determine whether the checksums match. If the checksums match, the network data may be considered to be authenticated. A checksum may be a hash of the file. Digital signatures or other known techniques may be used to authenticate the network data. Based on the types of outliers various actions may be executed by the remote analytics platform 232. In an example, the action may involve transmitting alerts or notifications to the responsible personnel. In an example, the action can involve transmitting signals to the tray 204 to stop the product build process or the test if the environmental parameters are outside the set ranges.

Figure 3:
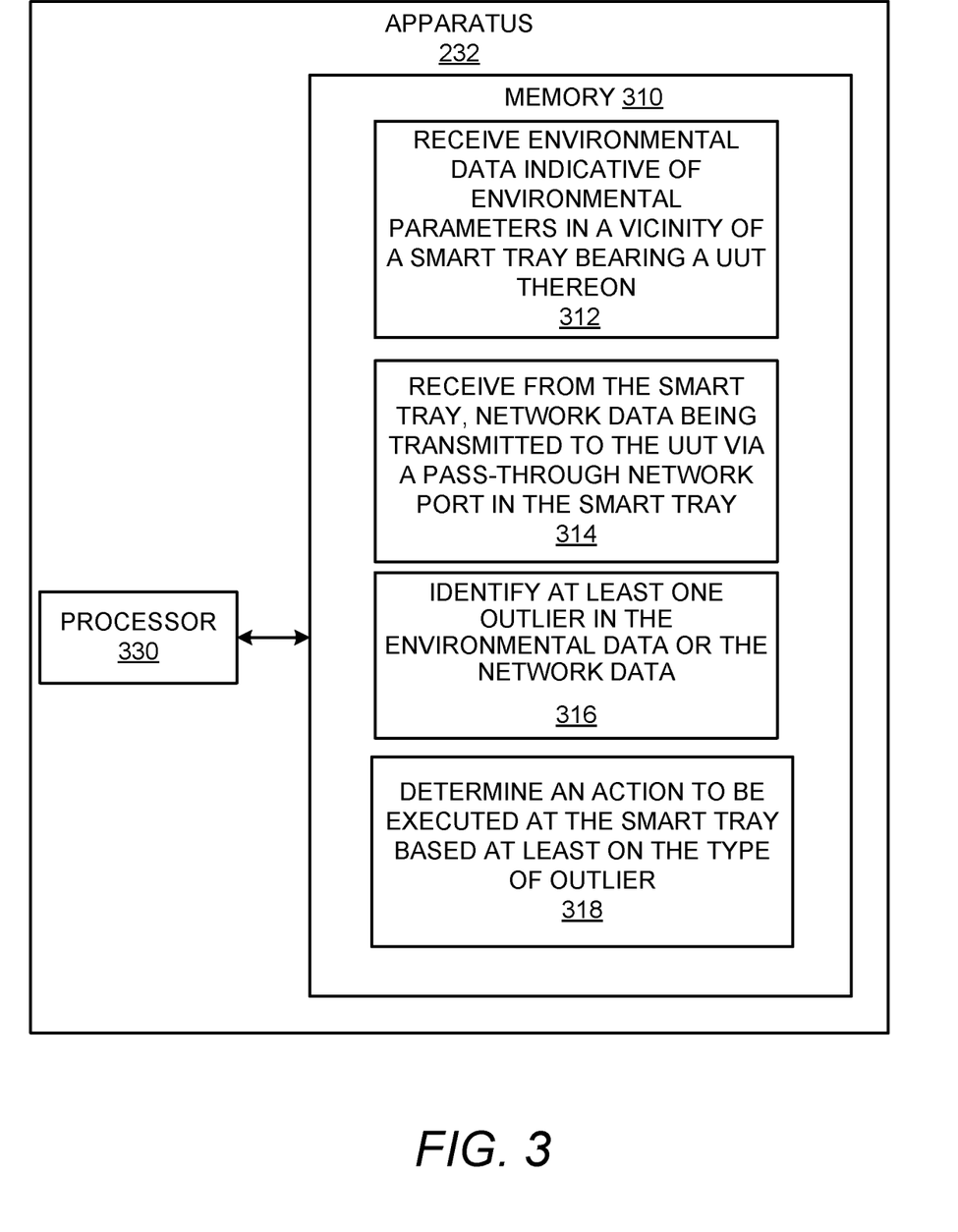
FIG. 3 shows block diagram of a remote analytic platform that can monitor and secure a product build process in accordance with examples disclosed herein.

FIG. 3 shows block diagram of the remote analytic platform 232 that can monitor and secure a product build process thereby ensuring the quality of the product 202 and security of the product build process. It should be understood that the remote analytics platform 232 depicted in FIG. 3 may include additional components and that some of the components described herein may be removed and/or modified without departing from a scope of the remote analytics platform 232 disclosed herein.

The remote analytics platform 232 may include a processor 330 that may control operations of the remote analytics platform 232. The remote analytics platform 232 may be a computing device such as a personal computer, a laptop computer, a server computer, a tablet computer, or the like. In a particular example, the remote analytics platform 232 is a cloud-based server. The processor 330 may be a semiconductor-based microprocessor, a central processing unit (CPU), an application specific integrated circuit (ASIC), a field-programmable gate array (FPGA), and/or other hardware device.

The remote analytics platform 232 may also include a processor-readable storage medium or memory 310 that may have stored thereon machine readable instructions 312-318 (which may also be termed computer readable instructions) that the processor 330 may execute. The memory 310 may be an electronic, magnetic, optical, or other physical storage device that contains or stores executable instructions. The memory 310 may be, for example, Random Access Memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The processor 330 may fetch, decode, and execute the instructions 312 to receive environmental data indicative of environmental parameters in the vicinity of the tray 204 bearing the product 202 or a UUT thereon. The processor 330 may further execute instructions 314 to receive from the tray 204, network data being transmitted to the product 202 or UUT via the network port 234 in the tray 204. The data thus collected from the sensors, RFID readers as well as data sent to and from the network port 234 is logged for future analysis and each data item may be timestamped and associated with the product ID and/or the tray ID.

The processor 330 may fetch, decode and execute instructions 316 to identify at least one outlier in the environmental data or the network data or combinations thereof so that any environmental parameters that maybe causing errors within the network data being transmitted to the product 202 are detected. If no outliers are detected, the remote analytics platform 232 continues to operate in a passive monitoring mode allowing the product build process to continue undisturbed. If one or more outliers are detected on execution of the instructions 316, the processor 330 may fetch, decode and execute instructions 318 that determine an action to be executed at the tray 204 based at least on comparison type of outlier. So that if the outlier is associated with the environmental data, the outlier may be compared to determine whether the outlier lies within a set range of the predetermined threshold. If yes, then notifications or alerts may be sent to client devices 262 and 264 of responsible personnel which are configured to receive such notifications. If the outlier is outside a set range of the predetermined threshold, the product build process may be shut down in addition to sending out the notifications. If the outlier is identified from the network data such as an authentication failure, then the instructions 318 may cause the build process to be shut down and/or a notification be sent to the client devices 262 and 264 based on the severity of the error in the product caused by the outlier. It can be appreciated that the outlier can be of various types such as one or more numerical values when associated with environmental data for example, or the outlier may be one or more events such as an authentication failures when associated with the network data etc. In other instances, the outlier may also be a combination of the numerical data and events wherein a numerical data is flagged for review upon occurrence of an event. For example, when a particular part is placed in the product 202 it may cause an authentication failure. In this case, the outlier may be a combination a numerical value (e.g., a RFID tag of the part) and the authentication failure event which may indicate that the wrong part was placed in the product 202 due to which the firmware or device driver fails to be installed. Event outliers may trigger actions such as transmission of particular error codes/messages.

Figure 4A:
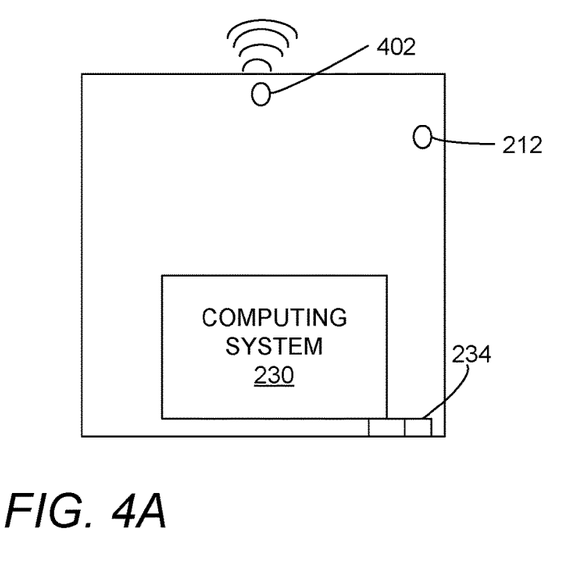
FIGS. 4A and 4B illustrate a tray from different angles in accordance with the disclosed examples.
Figure 4B:
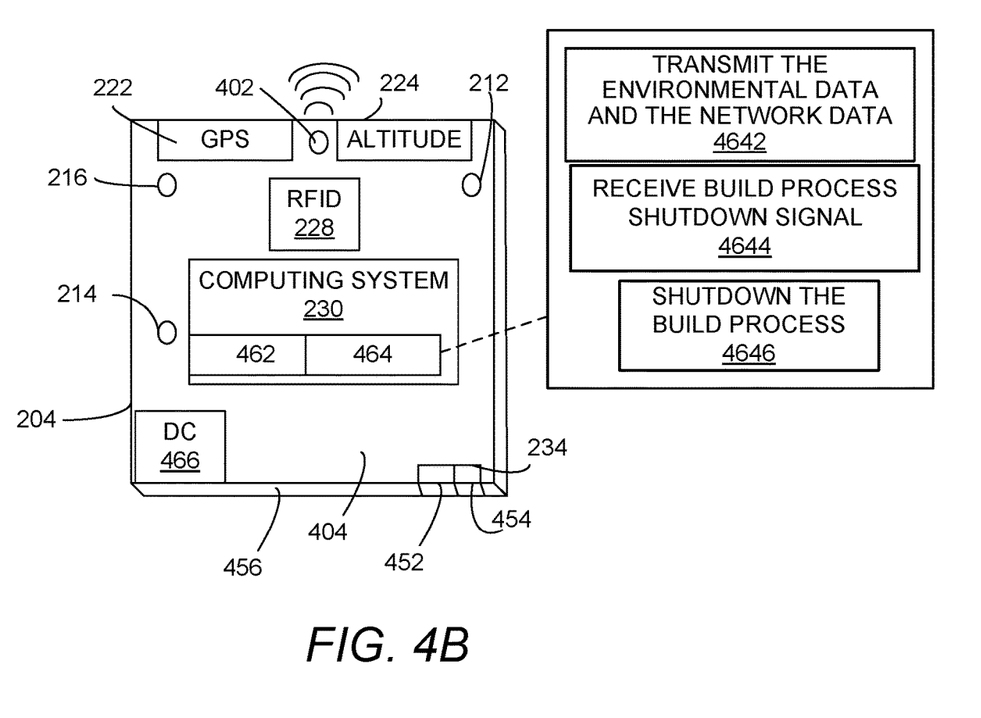

FIGS. 4A and 4B illustrate the tray 204 from different angles in accordance with the disclosed examples. FIG. 4A shows a top view of the tray while FIG. 4B shows the top-down view at a slight angle so that the sides of the tray 204 are visible. In addition to the at least one sensor 212, the computing system 230 and the network port 234, the tray 204 as shown in FIG. 4A also includes a transceiver 402 that enables the tray 204 to exchange data signals via communication channels such as Wi-Fi so that data collected from the various sensors can be logged at the remote analytics platform 232. The tray 204 may be made of strong materials such as metals, polymers, plastics and the like.

In FIG. 4B further details of the tray 204 are shown. The tray 204 is made of a receptacle 404 that is shaped and sized to hold thereon products or UUTs of different sizes and shapes and further includes sensors 214, 216 that collect environmental data, the GPS sensor 222 and altitude sensor 224, the RFID reader 228 in addition to the transceiver 402. The tray 204 further includes an RFID shield 456 affixed to the bottom surface of the tray 204 so that when the tray 204 is arranged on a rack, the tray 204 can be shielded from transmitting its associated RFID data to or reading RFID data associated with other proximate trays below it. The RFID reader 228 enables collecting RFID signals from the product 202 when mounted on the tray 204. A Universal Serial Bus (USB) or other port may connect to the RFID reader 228 which can check the internal components (processor, memory etc.) of the product 202 that are present as each component of the product 202 being manufactured may have its own RFID indicia. Also, the RFID indicia of employees nearby the product can also be collected. In this way not only can the components in the product 202 be verified but also the changes and the employee(s) who made the changes can be automatically logged and sent to the remote analytics platform 232 without the need for log sheets or data entries from the employee(s).

In an example, the network port 234 may be a pass through port that provides power from the factory automation infrastructure 242. The tray 204 may also be provided with a DC backup battery 466 so that the tray 204 remains functional even when power from the factory automation infrastructure 242 is cut off. The first IN network port 452 of the network port 234 can be connected to the factory automation infrastructure 242. The first IN network port 452 may be a Power over Ethernet (PoE) port in an example. The second OUT network port 454 may connect the tray 204 to a network port of the product 202. In an example, the first IN network port 452 may be connected to the second OUT network port 454 via the computing system 230. The computing system 230 of the tray 204 may have encryption software or encryption device installed on a motherboard so that the network data exchanged between the product 202 and the factory automation infrastructure 242 can be encrypted. For example, a Virtual Private Network (VPN) or tunnel may be created for secure communication over the factory automation infrastructure 242 between the tray 204 and a server from which the network data such as the software or a test to be uploaded to the product 202 is received.

The computing system 230 may also include hardware such as a processor 462 and non-transitory processor readable storage medium 464. The computing system 230 can therefore include hardware or software firewalls, attack prevention system and Intrusion Prevention System (IPS) to protect the product 202 from attack when under testing. Therefore, even if a malicious third party hacked into the factory network forming a part of the factory automation infrastructure 242, the product 202 may still be protected. In an example, the non-transitory processor readable storage medium 464 stores thereon instructions 4642-4646 that enable the tray 204 to perform the environment monitoring functions. The instructions 4642 enable the processor 462 to transmit environmental data collected from the various sensors 212-216 including the GPS sensor 222 and the altitude sensor 224 and the network data being supplied to the product 202 to the remote analytics platform 232. Based on the analysis of the data received from the tray 204, the remote analytics platform 232 may transmit a signal to the tray 204 to shut down the product build process. Accordingly, instructions 4644 to receive signal to shut down the product build process are executed and in response to the execution of the instructions 4644, the processor 462 may execute the instructions 4646 to shut down the product build process or halt the testing of the UUT.

FIG. 5 illustrates a plurality of the trays 502, 504, 506, 508 and 510 arranged on a rack 500 one below another. Each of the trays 502-510 includes a respective product 512, 514, 516, 518 and 520 thereon for testing. It may be noted that each of the trays 502-510 has a respective RFID shield 522, 524, 526, 528 and 530 affixed underneath the tray in order to prevent the RFID reader of one tray from picking up the RFID information pertaining to another tray or transmitting its RFID information to another tray. A manufacturing establishment may have tens or hundreds of such racks for testing products and the remote analytics platform 232 via the IoT hub 244 is enabled to simultaneously collect environmental data and the network data from each product on each tray mounted to the racks. In fact, the remote analytics platform 232 may act as a centralized analytics resource for many such manufacturing units scattered across the globe. The remote analytics platform 232 can therefore simultaneously monitor and secure environment of each product being tested at each given manufacturing location on a global scale. Of course, it can be appreciated that it is not necessary that a single remote analytics platform 232 serve all the manufacturing locations. Rather, a network of remote analytics platforms with each remote analytics platform monitoring and securing multiple manufacturing locations and exchanging the information obtained from the collected data with other remote analytics platforms can be implemented in some examples. Moreover, storing the environmental and data from numerous locations for historical analysis may enable using Artificial Intelligence elements for various functions executed by the remote analytics platform 232. For example, Artificial Intelligence (AI) elements such as classifiers may be trained using the historical data in identifying anomalies or outliers, determining thresholds for the various environmental parameters, determining ranges for the thresholds, the actions that are to be executed for the outliers and the like.

Figure 6:
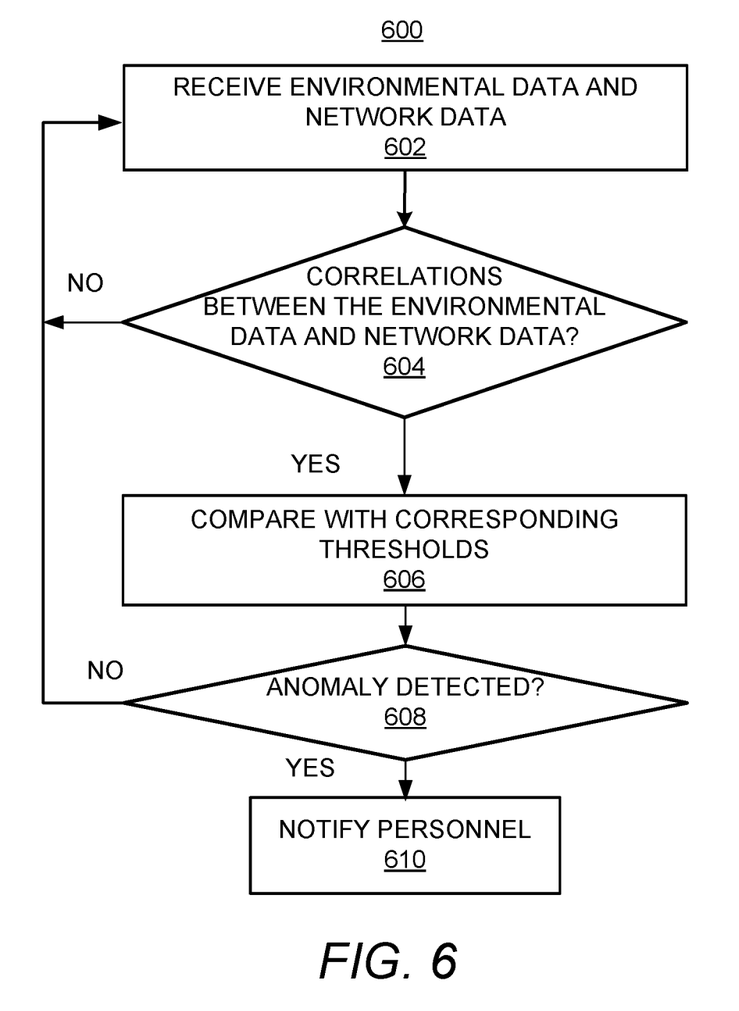
FIG. 6 shows a flowchart that details a method of monitoring and securing a product build process in accordance with examples disclosed herein.

FIG. 6 shows a flowchart that details a method 600 of monitoring and securing a product build process in accordance with examples disclosed herein. The method 600 may be executed by the remote analytics platform 232 in some examples. The environmental data from the various sensors attached to the tray 204 and the network data being uploaded to the product 202 is initially received at block 602. The correlations between the environmental data and the network data are identified at 604. In detecting correlations, the environmental data values can be compared with the corresponding historical values or predetermined thresholds. If one or more of the environmental data are outside the predetermined thresholds then such values may be flagged. In addition to examining deviations in each environmental data value, combinations of each environmental data value with the network data values may also be examined in order to identify the correlations at 604. As mentioned in an example above, a correlation may be detected between a particular RFID reader output and deviation in sensor data which may indicate that a faulty part is installed in the product 202. If no correlations are detected at 604, the method returns to 602 to passively monitoring the product build process by receiving the environmental data and the network data.

At block 606, the correlations detected at block 604 are compared with the corresponding thresholds which, in some instances, may be determined based on the historical values. It can be the case that certain correlations occur frequently but do not lead to faulty products. If historically the correlations do not lead to faulty product, no anomaly or outlier is recorded at 608 and the process again returns to block 602. If the correlation between certain values occurs for the first time or rarely and is not previously recorded in the historical data, such correlation can be flagged as an anomaly at block 608 and the responsible personnel are notified at block 610 so that the correlation may be further investigated.

Figure 7:
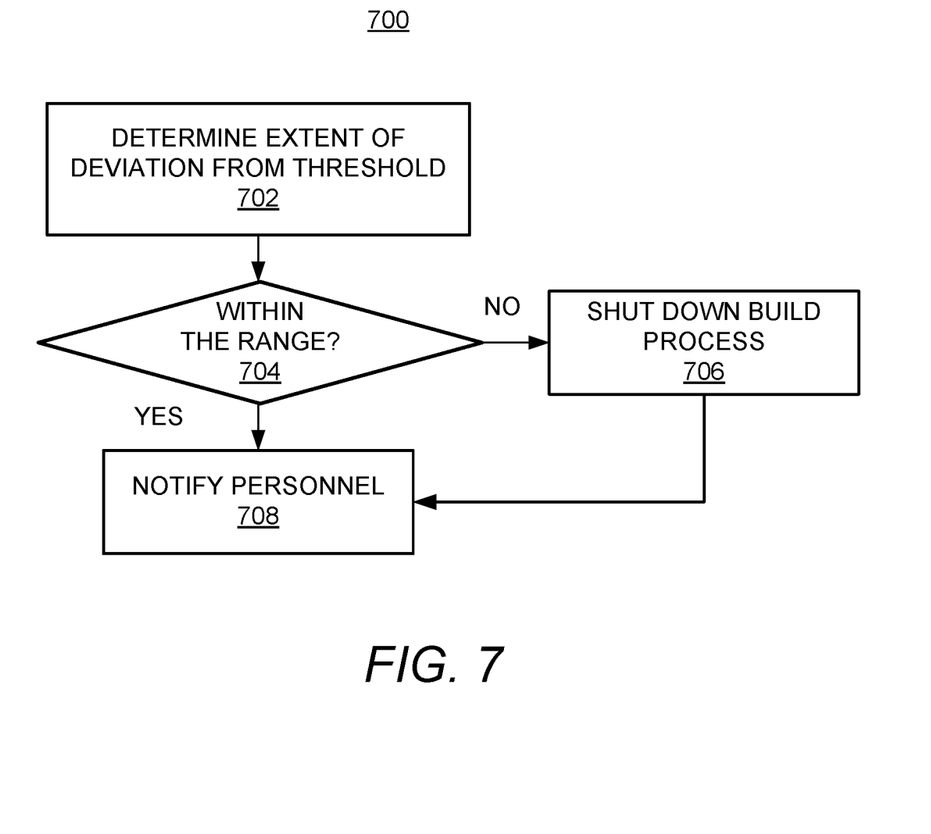
FIG. 7 details a method of determining an action to be executed at the tray when an outlier is detected in accordance with some examples.

FIG. 7 details a method 700 of determining an action to be executed at the tray 204 when an outlier is detected in accordance with some examples. At block 702, the extent of deviation of the outlier when compared with a corresponding threshold is determined. As mentioned herein, each outlier may have a corresponding threshold and a range of permitted deviation defined in the remote analytics platform 232. In some examples, a last recorded historical value of the outlier may correspond to the threshold or the range associated with the threshold. For example, when the outlier pertains to a correlation between two or more elements of the environmental data and the network data, the threshold may correspond to the last recorded value. In the case where the correlation was not previously detected, the threshold value may correspond to zero and such a correlation may be flagged for further review or the build process may be shutdown based on the deviations of other environmental data. At block 704, it is determined if the outlier is within the range of the permitted deviation. If yes, the method merely notifies the response personnel regarding the outlier for further investigation. If however, the outlier lies beyond the permitted deviation range then the build process may be shut down as shown at block 706 and the responsible personnel may be notified at block 708. For example, if the temperature of the product 202 or a UUT is rising rapidly beyond the normal temperature ranges, the execution of the method 700 serves to protect the UUT by shutting down the operation of the UUT and informing the personnel thereby protecting the UUT from further damage. Accordingly, an instruction may be transmitted from the remote analytics platform 232 to the tray 204 that causes the processor 462 of the tray 204 stop the test or cut off the power supply.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of monitoring a product build process via a smart tray, the method comprising:
   receiving from at least one sensor on a smart tray, environmental data indicative of at least one environmental parameter in a vicinity of a product being built;
   receiving from the smart tray, network data transmitted to the product being built during the product build process via a network port in the smart tray, the network data including firmware or software loaded into the product being built;
   identifying at least one outlier in the environmental data;
   analyzing the network data, the analyzing including comparing a checksum of the network data to a trusted checksum, and including an authentication failure of the network data in the at least one outlier in response to the checksum not matching the trusted checksum;
   determining an action to be executed at the smart tray in response to the outlier; and
   transmitting the action to the smart tray to instruct the smart tray to perform the action affecting the product build process.

2. The method of claim 1, wherein receiving the environmental data further comprises:
   receiving the environmental data at a computing system remote from a manufacturing location of the product being built; and
   comparing the at least one outlier to a corresponding predetermined threshold if the at least one outlier is identified in the environmental data.

3. The method of claim 2, wherein determining the action is based on the comparison and includes determining that, in response to the at least one outlier being outside a specified range of the predetermined threshold, the action is to transmit a notification regarding the at least one outlier to a client device.

4. The method of claim 2, wherein determining the action is based on the comparison and includes determining, in response to the at least one outlier being outside a specified range of the predetermined threshold, that the action includes transmitting a notification regarding the at least one outlier to a client device and instructing the smart tray to terminate the product build process.

5. The method of claim 1, wherein receiving the environmental data from the at least one sensor further comprises:
   receiving the environmental data from a plurality of sensors on the smart tray.

6. The method of claim 1, wherein determining the action to be executed at the smart tray in response to the outlier further comprises:
   determining, in response to the authentication failure being included in the at least one outlier, that the action includes transmitting a notification regarding the at least one outlier to a client device and instructing the smart tray to terminate the product build process.

7. The method of claim 1, further comprising:
   analyzing the environmental data and the network data to detect a correlation between the environmental data and the network data; and
   generating a notification in response to detecting the correlation.

8. A non-transitory, processor-readable storage medium storing machine readable instructions that when executed by a processor, cause the processor to:
   receive environmental data indicative of environmental parameters in a vicinity of a smart tray bearing a unit under test (UUT) thereon;
   receive from the smart tray, network data transmitted to the UUT via a network port in the smart tray, wherein the network data includes firmware or software loaded into the UUT;
   analyze the network data, the analyzing including comparing a checksum of the network data to a trusted checksum, and determining an authentication failure of the network data in response to the checksum not matching the trusted checksum;
   identify an outlier in the environmental data or the network data, wherein the outlier includes the authentication failure if analyzing the network data determines the authentication failure;
   determine an action to be executed at the smart tray in response to the outlier; and
   transmit the action to the smart tray to instruct the smart tray to perform the action affecting a test of the UUT.

9. The non-transitory, processor-readable storage medium of claim 8, wherein the machine readable instructions further comprise instructions that cause the processor to: receive the environmental data from at least one sensor affixed to the smart tray.

10. The non-transitory, processor-readable storage medium of claim 8, wherein the machine readable instructions to determine the action further comprise instructions that cause the processor to:
   determine that a test of the UUT is to be terminated, and determine that the action includes instructing the smart tray to terminate the est of the UUT.

11. The non-transitory, processor-readable storage medium of claim 10, further comprising instructions that cause the processor to:
   transmit a signal to the smart tray terminating the test of the UUT.

12. An apparatus that monitors a build process, the apparatus comprising:
   a tray configured to bear thereon a unit under test (UUT);
   at least one sensor included in the tray that senses at least one environmental parameter in a vicinity of the tray;
   a first network port included in the tray connectable to a factory network to receive data from the factory network;
   a second network port included in the tray connectable to the UUT to convey the data received by the first network port to the UUT, wherein the data includes firmware or software to be loaded into the UUT;
   a wireless transceiver included in the tray that exchanges data signals between the tray and a remote analytics platform via a wireless access point; and
   a computing system incorporated into the tray, wherein the computing system transmits the at least one environmental parameter and the data to a remote analytics platform via the wireless transceiver and receives instructions from the remote analytics platform to perform an action when the remote analytics platform identifies an outlier in the at least one environmental parameter or the data, wherein the remote analytics platform identifies the outlier in the data by determining that a checksum of the data does not match a trusted checksum.

13. The apparatus of claim 12, wherein the tray further comprises:
   a backup battery that powers at least one the sensor, the wireless transceiver, and the computing system.

14. The apparatus of claim 12, wherein the tray has a plurality of sensors.

15. The apparatus of claim 14, wherein the plurality of sensors include at least one of a temperature sensor, a Global Positioning System (GPS) sensor, an altitude sensor, a pressure sensor, a hygrometer, or a Radio-Frequency Identification (RFID) reader.

16. The apparatus of claim 12, wherein the tray comprises an RFID shield to shield a bottom surface of the tray.

17. The apparatus of claim 12, wherein the tray further encrypts a connection that provides the data to the UUT from the factory network.

18. The apparatus of claim 12, wherein the tray is among a plurality of trays that are arranged one below another in a rack, and
   the tray includes an RFID shield that shields the tray from transmitting or receiving RFID information from other trays of the plurality of trays.

* * * * *